G. W. SALMON.
COW TAIL HOLDER.
APPLICATION FILED FEB. 27, 1913.
1,187,655. Patented June 20, 1916.
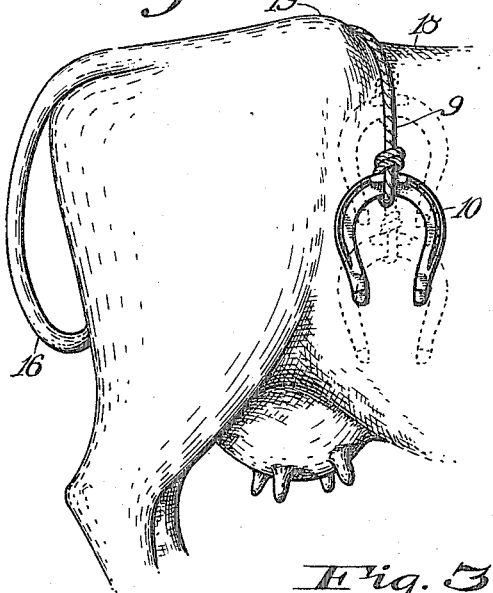
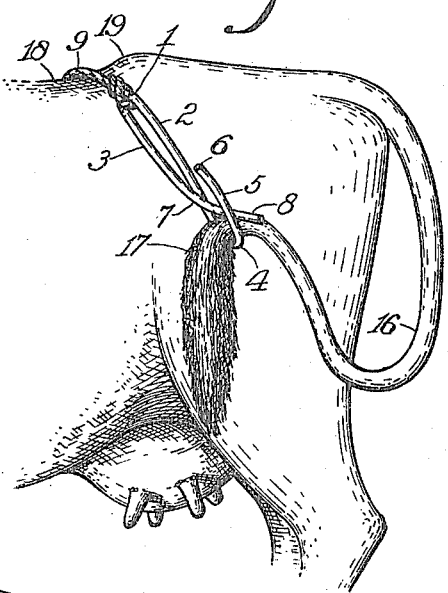
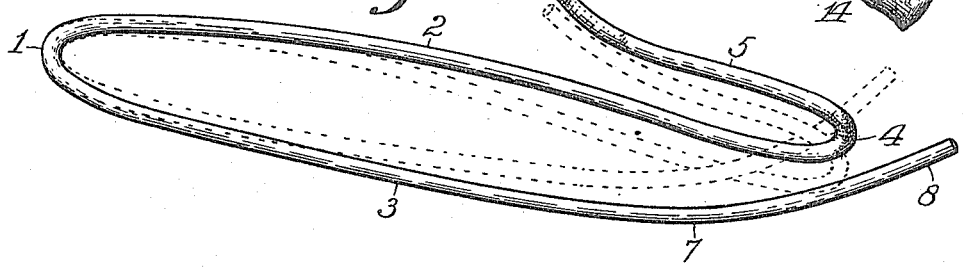
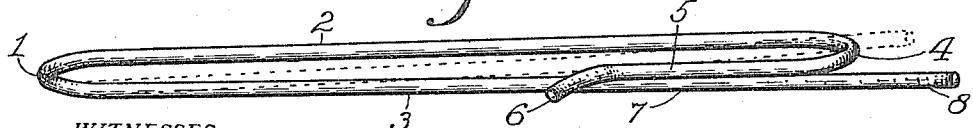
WITNESSES:
J. H. Gardner
M. L. Wilhelm
INVENTOR:
George W. Salmon,
BY
E. T. Silvius,
ATTORNEY.

UNITED STATES PATENT OFFICE.

GEORGE W. SALMON, OF INDIANAPOLIS, INDIANA.

COW-TAIL HOLDER.

1,187,655.     Specification of Letters Patent.     Patented June 20, 1916.

Application filed February 27, 1913. Serial No. 751,052.

*To all whom it may concern:*

Be it known that I, GEORGE W. SALMON, a citizen of the United States, residing at Indianapolis, in the county of Marion and State of Indiana, have invented a new and useful Cow-Tail Holder, of which the following is a specification, reference being had to the accompanying drawings and to the letters and figures of reference marked thereon.

This invention relates to appliances for use in dairies, on farms, or elsewhere for preventing cows from switching their tails into the milk pail or into the face of the milker when the cows are being milked, the invention having reference more particularly to readily adjustable means for holding a cow's tail in such position as to prevent the cow from moving the bush or end of the tail and without discomfort to the animal.

An object of the invention is to provide an improved cow tail holder that shall be so constructed as to be adapted to be produced cheaply and to be practical and efficient, to the end that cleanliness in the dairy may be encouraged.

A further object is to provide an improved cow tail holder that shall be so constructed that it shall be adapted to be applied to the animal alone in order that the animal may be free to shift its position slightly when standing and rest itself.

A still further object of the invention is to provide an improved cow tail holder that shall be relatively small and of light weight in order that it may be cheaply shipped from the factory and be readily carried about the user, and which may in some cases be made by the user of such materials as he may have at hand.

With the above mentioned and other objects in view, the invention consists in a cow tail holder comprising a combined hook and clasp, and flexible self-adjusting means for hanging the combined hook and clasp on an animal for holding the tail of the animal against the animal's body. And the invention consists further in the novel parts and in the combinations and arrangements of parts as hereinafter particularly described and claimed.

Referring to the drawings, Figure 1 is a fragmentary side view of a cow to which the improved tail holder is applied; Fig. 2 is a fragmentary view of the opposite side of the cow showing the invention applied thereto; Fig. 3 is a side view partially broken away showing the invention slightly modified; Fig. 4 is a side view of the combined hook and clasp; and Fig. 5 is a top view of Fig. 4.

Similar reference characters in the different figures of the drawings indicate like parts or features of construction herein referred to.

In practically carrying out the objects of the invention the combined hook and clasp is preferably formed of a single piece of suitable spring wire which is bent nearly upon itself intermediately of but at a point somewhat nearer one end than the opposite end thereof, whereby an approximately U-shaped loop 1 is formed from which extends two rods 2 and 3 divergently a short distance and thence following opposite curves and converging toward the farther portions thereof, so that the middle portions are curved outwardly and adapted to be grasped in the hand of the operator to be forced each toward the other. The rod 2 is bent outward and back toward itself whereby a crook 4 is formed from which extends a tongue 5 having a curved end portion 6 that extends away from the rod 2 to form a throat into which the tail of the animal may readily be received. By reference to Fig. 5 it will be seen that the tongue 5 does not extend exactly on the plane of the two rods 2 and 3, but owing to a slight lateral bend made in forming the crook 4 the tongue extends from the crook over slightly to one side of the plane of the two rods for a purpose which will presently appear. The wire forming the rod 3 has a curved portion 7 at a suitable distance from the end of the wire which brings the finger-like end portion 8 of the rod over toward the crook 4 but somewhat beyond it. This enables the operator when drawing the rods 2 and 3 together to draw the curved portion 7 up past the curved extremity 6 of the hook and let the rod 3 spring back and pass behind the extremity 6 against the side of the rod 2 and thence down to the crook 4 or against the tail of the cow.

A flexible line of any suitable material is connected to the loop 1 and may comprise a cord 9 to which is connected a horse-shoe 10 to serve as a weight, or any other suitable weight may be employed for the purpose, and if desired a relatively light weight cheaply formed chain 11 may be connected to the loop 1 and serve the purpose of a line or cable, the chain preferably being provided at its end with two links 12 and 13 to which is connected a suitable container such as a canvas sack 14 in which stones or pebbles 15 are placed to serve as a weight for causing frictional resistance of the line on the body of the animal.

In practical use the milker being on the right side of the cow grasps the rods 2 and 3, which serve as handles, in one hand and draws the hook over the tail 16 of the cow so as to bring the hook down near to the bush 17 of the tail, after which he forces the rod 3 toward the rod 2 so as to bring the end portion 8 between the rod 2 and the tongue 5 of the hook and let it press against the tail of the animal and thereby force the tail against the crook 4, not with sufficient force however to annoy the animal, but preventing the hook from slipping over the bush. The operator subsequently carries the line along the left side of the animal and brings the weighted end over to the right side and lets the line rest upon the back 18 just forward of the hip bones 19 of the animal, the weight resting against the right side of the animal's body while the bush of the tail is drawn against the left side of the body in such position that the animal is powerless to switch its tail. The weight, as will be understood, may be readily lifted or it may be lowered so as to adjust the position of the tail as may be desired, depending upon the size of the animal and the length of its tail. The holder may be readily removed from the tail by first withdrawing the finger-like extension 8 from the hook and then releasing the hook from the tail. The milkman may conveniently carry the holder from place to place by hanging it on his shoulders while carrying pails in his hands.

Having thus described the invention, what is claimed as new is—

The herein-described cow-tail holder comprising a flexible cable having two devices permanently connected to its two opposite ends respectively, the cable being adapted to lie on and extend over beyond opposite sides of the back portion of the cow forward of the hips thereof and frictionally resist longitudinal sliding movement of the cable thereon, one of the devices consisting of a combined spring hook and clasp appliance connected at one end thereof to the cable and having a crook to embrace the tail and also a tongue to yieldingly hold the tail in the crook, the appliance being adapted to frictionally clasp the cow's tail and slide to the bush of the tail, the remaining one of the devices consisting of a substantially flat and relatively broad weight element connected at one end thereof to the cable and adapted to lie flatly without rolling on the side of the cow, as and for the purpose set forth.

In testimony whereof, I affix my signature in presence of two witnesses.

GEORGE W. SALMON.

Witnesses:
MAY McMILLAN,
E. T. SILVIUS.

Copies of this patent may be obtained for five cents each, by addressing the "Commissioner of Patents, Washington, D. C."